(12) United States Patent
Bastioli et al.

(10) Patent No.: US 7,288,618 B2
(45) Date of Patent: *Oct. 30, 2007

(54) BIODEGRADABLE THERMOPLASTIC POLYESTERS

(75) Inventors: Catia Bastioli, Novara (IT); Tiziana Milizia, Novara (IT)

(73) Assignee: Novamont S.p.A., Novara (IT)

( * ) Notice: Subject to any disclaimer, the term of this patent is extended or adjusted under 35 U.S.C. 154(b) by 0 days.

This patent is subject to a terminal disclaimer.

(21) Appl. No.: 10/969,002

(22) Filed: Oct. 21, 2004

(65) Prior Publication Data

US 2005/0059796 A1 Mar. 17, 2005

Related U.S. Application Data

(63) Continuation of application No. PCT/EP03/04200, filed on Apr. 17, 2003.

(30) Foreign Application Priority Data

Apr. 22, 2002 (IT) .......................... MI2002A0867

(51) Int. Cl.
B29D 23/00 (2006.01)
B27M 3/00 (2006.01)
B27N 5/02 (2006.01)

(52) U.S. Cl. .................... 528/275; 428/35.2; 428/35.3; 428/35.6; 428/35.7; 428/36.1; 428/221; 428/304.4; 428/364; 428/365; 428/480

(58) Field of Classification Search ............... 528/275, 528/295.5, 296, 298, 300, 301, 302, 306, 528/307, 308, 308.6; 525/437; 524/35, 524/47; 428/35.2, 35.3, 35.6, 35.7, 36.1, 428/221, 304.4, 364, 365, 480
See application file for complete search history.

(56) References Cited

U.S. PATENT DOCUMENTS

| 5,436,056 | A | * | 7/1995 | Takiyama et al. ........... 428/141 |
| 5,589,566 | A | * | 12/1996 | White et al. ................. 528/286 |
| 5,714,569 | A | * | 2/1998 | Imaizumi et al. ........... 528/272 |

* cited by examiner

*Primary Examiner*—Nathan M. Nutter
(74) *Attorney, Agent, or Firm*—Connolly Bove Lodge and Hutz

(57) ABSTRACT

Biodegradable aliphatic thermoplastic polyesters useful for the production of several types of articles such as films, sheets, nets, expanded molded products, and the like, and process for their production.

26 Claims, No Drawings

BIODEGRADABLE THERMOPLASTIC POLYESTERS

This application is a Continuation of PCT/EP03/04200 filed Apr. 17, 2003 which in turn claims priority from Italian Application MI2002A000867, filed Apr. 22, 2002.

Described are biodegradable aliphatic thermoplastic polyesters useful for the production of various objects such as films, sheets, nets, expanded molded products, and the like, and the process for their production.

The present invention refers biodegradable polyesters of the diacid/diol type comprising at least one at least trifunctional compound in order to obtain articles with enhanced permeability, low gels content and an improved transparency.

From the description it will be evident that the polyesters according to the invention can be conveniently used for the production of various types of articles.

The present invention relates to a biodegradable thermoplastic aliphatic polyester from dicarboxylic acids, diols and one or more at least trifunctional compound, the polyester according to the invention comprising as repeating base units the following monomers:

a) at least one aliphatic dicarboxylic acid, or esters thereof, with $C_9$-$C_{13}$ atoms;
b) at least one aliphatic or cycloaliphatic diol, with 2-20 C atoms;
c) at least one at least trifunctional molecule wherein c), based on the sum of the moles of the aliphatic dicarboxylic acid and of said at least trifunctional compound, is comprised in the range from 0.05% and, as upper limit, a value according to the following formula:

$$\% P = \frac{0{,}0015 \cdot N^3}{f \cdot \sqrt{\eta_{inh}}}$$

which is applicable for $\eta_{inh} > 0.6$ dl/g and wherein:

% P=percentage in moles with respect to the sum of the moles of the dicarboylic acid and the moles of said at least trifunctional molecule;

N=average number of C atoms of the repeating diacid/diol unit in the main polymeric chain (for istance: for polyethylensebacate N=12, for polybutylensebacate N=14);

$\eta_{inh}$=minimum desired inherent viscosity (in 0.2 g/dl $CH_3Cl$ solution at 25° C.);

f=number of reactive moieties in the at least trifunctional molecule.

The above formula allows to determine the concentration range of the polyfunctional compound according to its chemical nature and to the viscosity and the chemical structure of the polyester. For instance a high viscosity polyesamethylensebacate with low gel content can be obtained with a high percentage of polyfunctional molecule whereas a high viscosity polyethylensebacate shows high gel content with lower polyfunctional compound percentage.

Polyesters according to the invention are characterized by high permeability values which render them particularly useful for the production of breathable articles such as packaging films and packaging foams for fruit and vegetables.

A further characteristic of the present polyesters is their improved transparency which render them particularly suitable for applications in the packaging area and agricultural field.

According to the present invention the polyesters do not exhibit significant cross-linking phenomena which would lead to gel formation rendering them unsuitable for various processing types, such as for instance film blowing.

The polyesters according to the invention exhibit a high permeability which is determined as water vapor transmission rate and measured on films according to ASTM E 96-90. The values are higher than $$550 \frac{g \cdot 30 \, \mu m}{m^2 \cdot 24h},$$

preferably higher than $$600 \frac{g \cdot 30 \, \mu m}{m^2 \cdot 24h}.$$

The polyesters according to the present invention are obtained with a gel fraction lower than 2.0% (w/w) with respect to the polyester.

Polyesters of the present invention can be blown in films with thicknesses of 25-30 μm which have characteristics of improved light transparency and Haze.

Polyesters of the present invention have low values of Acid Number which render them particularly stable to hydrolysis.

Examples of dicarboxylic acids are azelaic, sebacic, undecandioic, dodecandioic, and brassylic acids.

Examples of diols include 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexandimethanol, propylene glycol, neopentylglycol, 2-methyl-1,3-propandiol, dianhydrosorbitol, dianhydroman-nitol, dianhydroiditol, cyclohexanediol, cyclohexanmethanediol.

Examples of the at least trifunctional compound include glycerol, pentaerythritol, trimethylolpropane, citric acid, densipolic acid, auripolic acid, epoxydized soybean oil and castor oil.

Advantageously, to the polymer according to the present invention one or more unsaturated acids, of natural or synthetic origin, may be added.

Examples of unsaturated acids of synthetic origin are maleic acid, fumaric acid, vinylacetate, acrylic acids, methacrylic acids, hydroxyalkylacrilates and hydroxyalkylmethacrilates.

Examples of unsaturated acids of natural origin are fatty acids, among which monounsaturated hydroxy acids, such as ricinoleic and lesquerolic acid, and mono-, or polyunsaturated monocarboxylic acids, such as oleic acid, erucic acid, linoleic acid, linolenic acid. The unsaturated acids of natural origin can be used either pure or mixed with other fatty acids, saturated or unsaturated. In particular they can be used as blends obtained from saponification or transesterification of the vegetable oils which they originate from. For instance, ricinoleic acid, in the form of methylricinoleate, can be used in a more or less pure form deriving from a transesterification reaction of castor oil with methanol, and subsequent removal of glycerin (a byproduct of the reaction) and excess methanol.

The concentration of the unsaturated acid of natural origin is lower than 15% in moles based on the sum of the moles of unsaturated acid and the moles of the aliphatic dicarboxylic acid or esters thereof, preferably in the range 0.5-6 and more preferably 1-5%.

The polyesters according to the invention have a Molecular weight $M_n$ comprised between 30,000-150,000 preferably 40,000-120,000.

The polyesters according to the invention have an inherent viscosity (as measured with an Ubbelhode viscometer for solutions in $CHCl_3$ at a concentration of 0.2 g/dl at 25° C.) which is comprised in the range from 0.6 to 1.5 preferably from 0.7 to 1.4 dl/g.

The Melt Flow Rate (MFR) of the polyesters according to the invention, when used for typical applications of plastics (for instance, film blowing, foams, etc.), is within the range of 0.5 to 150 g/10 min, preferably 1.5 to 70 g/10 min, more preferably 3.0 to 50 g/10 min (measured at 150° C./2.16 kg, according to ASTM D1238).

Polyesters have a density measured with a Mohr-Westphal scale lower than 1.25 $g/cm^3$, preferably lower than 1.15 $g/cm^3$.

The polyester according to the invention may comprise, besides the base monomers, at least an hydroxy acid in an amount within the range of 0-50%, preferably 0-30% moles based on the moles of the aliphatic dicarboxylic acid. Examples of convenient hydroxy acids are glycolic acid, hydroxybutyric acid, hydroxycaproic acid, hydroxyvaleric acid, 7-hydroxyheptanoic acid, 8-hydroxycaproic acid, 9-hydroxynonanoic acid and lactic acid.

Besides, the polyester according to the invention may comprise, while actually maintaining biodegradability, up to 50 moles %— based on the content of dicarboxylic acid and of possibly any other acid included in the chain—of a polyfunctional aromatic compound such as, for instance, phthalic acids, in particular terephthalic acid, bisphenol A, hydroquinone and the like.

Moreover, the polyester according to the invention may be used in blends, obtained also by reactive extrusion either with polyesters of the same type or with other biodegradable polyesters (e.g. polylactic acid, poly-ε-caprolactone, polyhydroxyalkanoates, polyalkylensuccinates) or polymers other than polyesters; it may also be used in blends with polymers of natural origin, such as, e.g., starch, cellulose, chitosan alginates or natural rubbers. Starches and celluloses may be modified and among them there may be mentioned, for instance, starch or cellulose esters with a substitution level within the range of 0.2 to 2.5, hydroxypropylated starches, starches modified with fat chains. Starch may be used either destructurized, in a gel or in a filler form.

The polyesters according to the invention have, as such, viscosity values that make them suitable for use, by appropriate control of the relevant molecular weight, in many practical applications such as films, foams, thermoformed products, etc.

In particular, the polymers according to the invention are suitable for the production of:

films, either mono- or bidirectional, and multi-layer films with other polymeric materials;
films for agricultural use such as mulching films;
bags and liners for organic waste collection;
mono- or multi-layer food packaging, such as for instance containers for milk, yogurt, meat, drinks, etc;
coatings obtained with the extrusion coating technique;
multi-layer laminates with layers of paper, plastics, aluminum, metalized films;
expanded or expandable beads for the production of articles obtained by syntherization;
expanded and semi-expanded products, including expanded blocks obtained from pre-expanded particles;
expanded and thermoformed sheets and containers obtained therefrom for food packaging;
containers in general for fruits and vegetables;
composites with gelatinized, destructurized and/or complexed starch, natural starch, flours, other natural, vegetable or inorganic fillers, for use as filler;
fibers, microfibers, fabrics and non-woven fabrics for the sanitary and hygiene sectors.

The biodegradable polyester according to the invention can be prepared according to the known processes for the synthesis of polyesters. In particular, the polyester can be advantageously obtained through a polycondensation reaction wherein a first esterification or transesterification step— carried out at temperatures comprised between 180° C. and 230° C., up to the distillation of at least 85%, preferably at least 90% of the byproducts (water or monovalent alcohol)—is followed by a second deglycolation step carried out preferably at temperatures between 200° C. and 250° C. under hard vacuum, i.e. at a pressure lower than 10 mmHg, preferably lower than 5 mmHg.

Advantageously, the polymerization process of the polyester can be carried out in the presence of a suitable catalyst. Suitable catalysts are, e.g., organometallic tin compounds, for instance the derivatives of stannoic acid, titanium compounds, for instance orthobutyltitanate, aluminum compounds, for instance triisopropoxy aluminum, antimony and zinc compounds.

Advantageously, in the production process of the polyester according to the invention, the diol is provided in the reaction system in an amount comprised between 1 and 1.5 moles per mole of diacid or ester thereof.

Among the known processes of polyester synthesis there may be also mentioned processes wherein the polymer is obtained by fermentation synthesis or genetic engineering methods.

Some examples of the polyester according to the invention are now illustrated by way of mere non exhaustive exemplification.

EXAMPLES

In the examples, inherent viscosity is measured with a Ubbelhode viscosimeter at 25° C. in chloroform, at a concentration of 0.2 g/dl. The procedure is according to ASTM D 2857-89;

MFR was measured at 2.16 Kg and 150° C. according to ASTM D 1238-89.

The gel fraction, according to the present invention, is measured by placing a sample of polyester ($X^1$) in chloroform (so as to prepare a solution of a concentration close to 0.02 $g/cm^3$), heating until refluxing of chloroform for 8 h, filtering the mixture on a sieve under vacuum, and weighing the weight of the material that remains on the filtering grid ($X^2$). The gel fraction was determined as the ratio of the material so obtained with respect to the weight of the sample ($X^2/X^1$)×100.

The determination of the values of transmittance at the source port ($T_{SOURCE}$) and Haze was effected by means of a HAZEGUARD SYSTEM XL-211 according to ASTM D 1003.

The Acid Number was measured according to the following method. About 1-3 grams of polymer were dissolved in 10 ml of toluene and 10 ml of pyridine heating till refluxing. Then the solution was cooled to room temperature, 5 ml of water and 50 ml of THF were added and titration was carried out with a standard KOH solution. The determination was repeated without test substance (blank sample). The acid number was then found from the following formula:

$$AN = T \times 56.1 \times (V_1 - V_2)/m$$

where
T=titer of the standard KOH solution
m=weight of test substance in mg
$V_1$=ml of standard solution used with test substance
$V_2$=ml of standard solution used without test substance.

Example 1

8000 g sebacic acid (39.6 moles),
4000 g 1,4-butanediol (44.4 moles),
18.4 glycerin (0.2 moles; equal to 0.5 moles % based on the content of dicarboxylic acid and glycerin)

were added in a 25 l steel reactor provided with mechanical stirrer, nitrogen flow inlet, condenser and a connection with a vacuum pump.

The temperature was gradually increased under vigorous stirring and nitrogen flow up to 210° C. The reaction was carried on until 85% of the theoretical amount of volatile byproducts was distilled (water). Then 9.4 g of aluminium isopropoxide ($4.6 \cdot 10^{-2}$ moles) were added.

The temperature was then increased to 240° C. and a pressure of 2 mmHg was applied to the system. The reaction was carried on for 240 min. A polymer having an inherent viscosity of 1.2 dl/g, MFR=3.1 g/10 min, an Acid Number of 1.5 mgKOH/g was obtained.

The gel fraction was 0%.

The product so obtained was afterwards film blown in a Ghioldi Machine (L/D=30; screw diameter=40 mm; thermal profile: 120-135-145×2-145×4; 45 rpm and throughput=20 kg/h).

The water vapor transmission rate was measured (ASTM E 96-90) on the 25 μm film, obtaining a value of $$670 \frac{g \cdot 30 \mu m}{m^2 \cdot 24h}.$$

Haze (ASTM D1003) was 13% and light transmittance at the source port (Ts) (ASTM D1003) was 79% (measured 15 days after film blowing).

Example 2

5000 g sebacic acid (24.7 moles),
1690 g ethylene glicol (27.2 moles),
2.3 glycerin (0.025 moles; equal to 0.1 moles % based on the content of dicarboxylic acid and glycerin)
5 g monobutylstannoic acid ($2.4 \cdot 10^{-2}$ moles)

were added in a 25 l steel reactor provided with mechanical stirrer, nitrogen flow inlet, condenser and a connection with a vacuum pump. The temperature was gradually increased under vigorous stirring and nitrogen flow up to 210° C. The reaction was carried on until 85% of the theoretical amount of volatile byproducts was distilled (water).

The temperature was then increased to 240° C. and a pressure of 1 mmHg was applied to the system. The reaction was carried on for 140 min. A polymer having an inherent viscosity of 1.23 dl/g, MFR=5.3 g/10 min, an Acid Number of 1.2 mg KOH/g was obtained.

The gel fraction was 0.2%.

The products obtained in the example were afterwards film blown with a Formac Machine (L/D=25 screw diameter=20 mm; thermal profile: 60-110-120-130-135° C.; 35 rpm and throughput=2.1 kg/h).

The water vapor transmission rate was measured (ASTM E 96-90) on the 25 μm film, obtaining a value of $$650 \frac{g \cdot 30 \mu m}{m^2 \cdot 24h}.$$

Example 3

80.8 g sebacic acid (0.4 moles)
49.5 g 1,6-hexanediol (0.42 moles)
0.59 g glycerin ($6.4 \cdot 10^{-3}$ moles equal to 1.6% based on the content of dicarboxylic acid and glycerin)
0.12 g monobutylstannoic acid ($5.7 \cdot 10^{-4}$ moles)

were added in a 1.5 lt Pirex glass conic reactor provided with mechanical stirrer, nitrogen flow inlet, condenser and a connection with a vacuum pump. The temperature was gradually increased under vigorous stirring and nitrogen flow up to 210° C. The reaction was continued until 88% of the theoretical amount of volatile byproducts was distilled.

The temperature was then increased to 240° C. and the system was set at a pressure of 0.5 mmHg. The reaction was carried on for 270 min. A polymer having an inherent viscosity of 1.4 dl/g was obtained.

The gel fraction was 1.3%.

Comparative Example A 101 g sebacic acid (0.5 moles),
50.5 g 1,4-butanediol (0.56 moles),
0.69 g glycerin ($7.5 \cdot 10^{-3}$ moles equal to 1.5% based on the content of dicarboxylic acid and glycerin)

were added in a 1.5 lt Pirex glass conic reactor provided with mechanical stirrer, nitrogen flow inlet, condenser and a connection with a vacuum pump. The temperature was gradually increased under vigorous stirring and nitrogen flow up to 210° C. The reaction was continued until 88% of the theoretical amount of volatile byproducts was distilled. Then 0.12 g of aluminium isopropoxide ($5.9 \cdot 10^{-4}$ moles) were added.

The temperature was then increased to 240° C. and the system was set at a pressure of 0.5 mmHg. After 100 min a product having an inherent viscosity of 0.7 dl/g was obtained. After 120 min the product was crosslinked and it was not processable. The gel fraction was 15%.

Comparative Example B 101 g sebacic acid (0.5 moles),
34.1 g ethylenglycol (0.56 moles)
0.42 g glycerin ($4.5 \cdot 10^{-3}$ moles equal to 0.9% based on the content of dicarboxylic acid and glycerin)
0.1 g di butilstannoic acid ($4.8 \cdot 10^{-4}$ moles)

were added in a 1.5 lt Pirex glass conic reactor provided with mechanical stirrer, nitrogen flow inlet, condenser and a connection with a vacuum pump. The temperature was gradually increased under vigorous stirring and nitrogen flow up to 210° C. The reaction was continued until 88% of the theoretical amount of volatile byproducts was distilled.

The temperature was then increased to 240° C. and the system was set at a pressure of 0.5 mmHg. After 110 min a product having an inherent viscosity of 0.75 dl/g was obtained. After 120 min the product was crosslinked and it was not processable. The gel fraction was 50%.

Comparative Example C 8000 g sebacic acid (39.6 moles),
4000 g 1,4-butanediol (44.4 moles)

were added in a 25 l steel reactor provided with mechanical stirrer, nitrogen flow inlet, condenser and a connection with a vacuum pump. The temperature was gradually increased under vigorous stirring and nitrogen flow up to 210° C. The reaction was carried on until 85% of the theoretical amount of volatile byproducts was distilled (water).

Then 9.4 g of aluminium isopropoxide ($4.6 \cdot 10^{-2}$) moles were added. The temperature was then increased to 240° C. and a pressure of 2 mmHg was applied to the system. The reaction was carried on for 330 min. A polymer having an inherent viscosity of 1.22 dl/g, MFR=4.1 g/10 min was obtained.

The product so obtained was afterwards film blown in a Ghioldi Machine (L/D=30; screw diameter=40 mm; thermal profile: 120-135-145×2-145×4; 45 rpm and throughput=20 kg/h).

The water vapor transmission rate was measured (ASTM E 96-90) on the 25 μm film, obtaining a value of $$400 \, \frac{g \cdot 30 \, \mu m}{m^2 \cdot 24h}.$$

Haze (ASTM D1003) was 36% and light transmittance at the source port (Ts) (ASTM D1003) was 60% (measured 15 days after film blowing).

Example 4

4320 g sebacic acid (21.4 moles),
2120 g 1,4-butanediol (23.6 moles),
1000 g methyl ricinoleate (3.2 moles, >98% purity) equal to 13 mol % based on the content of sebacic acid and methyl ricinoleate.
18 g glycerin (0.2 moles; 0.9 moles % based on the content of dicarboxylic acid and glycerin)
10 g monobutyl stannoic acid (corresponding to $4.8 \, 10^{-2}$ moles)

were added in a 25 l steel reactor provided with mechanical stirrer, nitrogen flow inlet, condenser and a connection with a vacuum pump. The temperature was gradually increased under vigorous stirring and nitrogen flow up to 210° C. The reaction was carried on until 85% of the theoretical amount of volatile byproducts was distilled (water and methanol).

The temperature was then increased to 240° C. and a pressure of 0.6 mmHg was applied to the system. The reaction was carried on for 300 min. 5.4 kg are obtained of a polymer having an inherent viscosity of 1.21 dl/g, MFR=3.2 g/10 min, density=1.08 g/cm³. The gel fraction was 0.3%.

The product so obtained was afterwards made into a film with a Ghioldi Machine for film blowing (L/D=30; screw diameter=40 mm; thermal profile: 120-135-145×2-145×4; 45 rpm and throughput=20 kg/h); tensile properties (ASTM D882-88), tearing resistance (ASTM D1922-89) were measured, 15 days after film blowing, on the 25-30 μm film. The results are shown on Table I.

Example 5

4320 g sebacic acid (21.4 moles),
2120 1,4-butanediol (27.2 moles)
15.7 g glycerin (0.2 moles; 0.8 moles % based on the content of dicarboxylic acid and glycerin),
10 g monobutyl stannoic acid (corresponding to $4.8 \, 10^{-2}$ moles)

were added in the steel reactor of Example 4. The temperature was gradually increased under vigorous stirring and nitrogen flow up to 210° C. The reaction was carried on until 85% of the theoretical amount of volatile byproducts was distilled (750 water).

The temperature was then increased to 240° C. and a pressure of 0.6 mmHg was applied to the system. The reaction was carried on for 300 min. 5.0 kg are obtained of a polymer having an inherent viscosity of 1.17 dl/g, MFR=2.6 g/10 min, density=1.12 g/cm³.

The product so obtained was afterwards made into a film with a Ghioldi Machine for film blowing (L/D=30; screw diameter=40 mm; thermal profile: 120-135-145×2-145×4; 45 rpm and throughput=20 kg/h); tensile properties (ASTM D882-88), tearing resistance (ASTM D1922-89) were measured, 15 days after film blowing, on the 25-30 μm film. The results are shown on Table I.

With respect to the example 5, the copolyester according to Example 4 is less stiff and has an improved tearing resistance in the transversal direction as well as a best balancing (the break strength in the longitudinal and transversal direction of the polymer of Example 4 are, in fact, comparable).

TABLE I

| Example | 4 | 5 |
|---|---|---|
| Viscosity (dl/g) | 1.21 | 1,17 |
| MFR | 3.2 | 2,6 |
| Density (g/cm³) | 1.08 | 1,12 |
| Tensile properties - Machine Direction | | |
| Yield stress (MPa) | 10.5 | 27 |
| Stress at break (Mpa) | 23 | 37,5 |
| Yield elongation (%) | 5 | 7,5 |
| Elongation at break (%) | 290 | 325 |
| Modulus of elasticity (Mpa) | 340 | 800 |
| Energy at break (MJ/m³) | 49 | 94 |
| Tensile properties - Transv. Direction | | |
| Yield stress (MPa) | 10 | 23 |
| Stress at break (Mpa) | 14 | 18.5 |
| Yield elongation (%) | 4 | 3.6 |
| Elongation at break (%) | 595 | 80 |
| Modulus of elasticity (MPa) | 475 | 1055 |
| Energy at break (MJ/m³) | 55 | 12 |
| Tearing resistance (Elmendorf) | | |
| Longitudinal direction (N/mm) | 3 | 3 |
| Transversal Direction (N/mm) | 49 | 10 |

Example 6

202 g sebacic acid (1 mole)
100 g 1,4-butanediol (1.1 mole)
46.8 g methyl ricinoleate (0.13 moles; purity=85% wt) (obtained by base catalized transesterification reaction of castor oil and subsequent removal of glycerin—a byproduct of the reaction—and excess methanol) equal to 13% moles based on the content of sebacic acid and methyl ricinoleate,
1.2 g glycerin ($1.3 \cdot 10^{-2}$ moles equal to 1.3% mol based on the content of sebacic acid and glycerin)

were added in a 1.5 lt Pirex glass conic reactor provided with mechanical stirrer, nitrogen flow inlet, condenser and a connection with a vacuum pump. The temperature was gradually increased under vigorous stirring and nitrogen flow up to 210° C. The reaction was continued until 88% of the theoretical amount of volatile byproducts was distilled. Then 0.25 g of aluminum isopropoxide were added.

The temperature was then increased to 240° C. and the system was set at a pressure of 0.5 mmHg. The reaction was carried on for 360 min. 250 g of a polymer having an inherent viscosity of 1.2 dl/g, MFR=5 g/10 min and gel fraction of 0.4% was obtained.

The invention claimed is:

1. A thermoplastic biodegradable aliphatic polyester of the diacid/diol type
   comprising the following monomers:
   a) at least one aliphatic dicarboxylic acid, or esters thereof, with $C_9$-$C_{13}$ atoms;
   b) at least one aliphatic or cycloaliphatic diol, with 2-20 C atoms;
   c) at least one at least trifunctional molecule
   wherein c), based on the sum of the moles of the aliphatic dicarboxylic acid and of said at least trifunctional molecule, is comprised in the range from 0.05% to, as upper limit, a value according to the following formula $$\%P = \frac{0{,}0015 \cdot N^3}{f \cdot \sqrt{\eta_{inh}}}$$

which is applicable for $\eta_{inh} > 0{,}6$ dl/g and wherein
   % P=percentage in moles with respect to the sum of the moles of said at least trifunctional molecule and dicarboylic acids moles
   N=average number of C atoms of the repeating diacid/diol unit in the main polymeric chain
   $\eta_{inh}$=inherent viscosity
   f=number of reactive moieties in the at least trifunctional molecule, and
   further comprising a concentration of an unsaturated acid originating from vegetable oils of at least 0.5% and lower than 15% in moles based on the sum of the moles of unsaturated acid and the moles of the aliphatic dicarboxylic acid or esters thereof; and wherein said biodegradable aliphatic polyester has a gel fraction lower than 2.0% (w/w) with respect to the polyester.

2. The biodegradable polyester according to claim 1 characterized by a permeability higher than $$550 \frac{g \cdot 30\,\mu m}{m^2 \cdot 24h};$$

and wherein m is meters h is hours.

3. The biodegradable polyester according to claim 2 characterized by a permeability higher than $$600 \frac{g \cdot 30\,\mu m}{m^2 \cdot 24h}.$$

4. The biodegradable polyester according to claim 1 characterized by an inherent viscosity within the range of 0.6 to 1.5 dl/g.

5. The biodegradable polyester according to claim 4 characterized by a Melt Flow Rate within the range of 0.5 to 150 g/10 min.

6. The biodegradable polyester according to claim 5 wherein the aliphatic or cycloaliphatic diol is selected from the group consisting of 1,2-ethanediol, 1,2-propanediol, 1,3-propanediol, 1,4-butanediol, 1,5-pentanediol, 1,6-hexanediol, 1,7-heptanediol, 1,8-octane 1,9-nonanediol, 1,10-decanediol, 1,11-undeca-nediol, 1,12-dodecanediol, 1,13-tridecanediol, 1,4-cyclohexanedimethanol, neopentylglycol, 2-methyl-1,3-propanediol, dianhydrosorbitol, dianhydromannitol, dianhydroiditol, cyclohexanediol, and cyclohexanmethanediol.

7. The biodegradable polyester according to claim 6 wherein the at least trifunctional molecule is selected from the group consisting of glycerol, pentaerythritol, trimethylolpropane, citric acid, densipolic acid, auripolic acid, epoxidized soybean oil and castor oil.

8. The biodegradable polyester according to claim 1 wherein the unsaturated acid is selected from the group comprising ricinoleic acid, lesquerolic acid, oleic acid, erucic acid, linoleic acid, and linolenic acid.

9. The biodegradable polyester according to claim 1 wherein the unsaturated acid is selected from the group consisting of maleic acid, fumaric acid, vinylacetate, acrylic acids, methacrylic acids, hydroxyalkylacrilates and hydroxyalkylmethacrilates.

10. The polyester according to claim 1, wherein at least one hydroxy acid is included in an amount within the range of 0 to 30% moles based on the moles of the dicarboxylic aliphatic acid selected from the group consisting of glycolic acid, hydroxybutyric acid, hydroxycaproic acid, hydroxyvaleric acid, 7-hydroxyeptanoic acid, 8-hydroxycaproic acid, 9-hydroxynonanoic acid, and lactic acid.

11. The polyester according to claim 1, comprising up to 50% moles —based on the content of dicarboxylic acid and of any possible other acid present in the chain—of a polyfunctional aromatic compound selected from the group consisting of phthalic acids, bisphenol A, and hydroquinone.

12. A process for the production of a thermoplastic biodegradable aliphatic polyester of the diacid/diol type comprising the following monomers:
   a) at least one aliphatic dicarboxylic acid, or esters thereof, with $C_9$-$C_{13}$ atoms;
   b) at least one aliphatic or cycloalinhatic diol, with 2-20 C atoms;
   c) at least one at least trifunctional molecule wherein c), based on the sum of the moles of the aliphatic dicarboxylic acid and of said at least trifunctional molecule, is comprised in the range from 0.05% to, as upper limit, a value according to the following formula $$\%P = \frac{0{,}0015 \cdot N^3}{f \cdot \sqrt{\eta_{inh}}}$$

which is applicable for $\eta_{inh}>0.6$ dl/g and wherein
% P=percentage in moles with respect to the sum of the moles of said at least trifunctional molecule and dicarboylic acids moles N=average number of C atoms of the repeating diacid/diol unit in the main polymeric chain
$\eta_{inh}$=inherent viscosity
f=number of reactive moieties in the at least trifunctional molecule, and
further comprising a concentration of an unsaturated acid originating from vegetable oils of at least 0.5% and lower than 15% in moles based on the sum of the moles of unsaturated acid and the moles of the aliphatic dicarboxylic acid or esters thereof: and wherein said biodegradable aliphatic polyester has a gel fraction lower than 2.0% (w/w) with respect to the polyester;
comprising a first esterification or transesterification step, and a second vacuum-deglycolization step in the presence of a catalyst.

13. The process according to claim 12, wherein the catalyst is an organometallic compound.

14. The process according to claim 12, wherein the esterification or transesterification step is carried out at ambient pressure and temperatures within the range of 180° C. to 230° C. until distillation of at least 85% byproducts.

15. The process according to claim 14, wherein the deglycolation step is carried out in a dynamic vacuum and at temperatures within the range from 220 to 250° C.

16. The process according to claim 15, wherein the amount of diol used is within the range of 1 to 1.5 moles per mole of dicarboxylic acid or ester thereof.

17. Shaped articles obtainable from the biodegradable polyester of claim 1.

18. Shaped articles according to claim 17, wherein said articles are selected from the group consisting of monodirectional films, bidirectional films, multi-layer films with other polymeric materials, mulching films, and coatings obtained by extrusion coating technique.

19. Shaped articles according to claim 17, wherein said articles are selected from the group consisting of bags and liners for organic waste collection.

20. Shaped articles according to claim 17, wherein said articles are mono or multilayer food containers selected from the group consisting of milk containers, yogurt containers, meat containers, containers for drinks, fruit containers, and vegetables containers.

21. Shaped articles according to claim 17, wherein said articles are multilayer laminates comprising a layer of material selected from the group consisting of paper, plastics, aluminum, and metallized film.

22. Shaped articles according to claim 17, wherein said articles are selected from the group consisting of semi-expanded products, expanded products, expanded blocks from pre-expanded particles, expanded sheets, thermoformed sheets, and containers for food packaging made of expanded sheets or thermoformed sheets.

23. Shaped articles according to claim 17, wherein said articles are selected from composites with gelatinized, destructured and/or complexed starch or natural starch as filler.

24. Shaped articles according to claim 17, wherein said articles are selected from the group consisting of fibers, fabrics and nonwoven for the sanitary or hygiene sector.

25. The biodegradable polyester according to claim 1 wherein said concentration of an unsaturated acid is 0.5 to 6%.

26. The biodegradable polyester according to claim 1 wherein said concentration of an unsaturated acid is 1 to 5%.

* * * * *